March 24, 1959  D. M. SANDEFUR  2,879,059
MOBILE WORKHOLDING DEVICE
Filed March 13, 1958
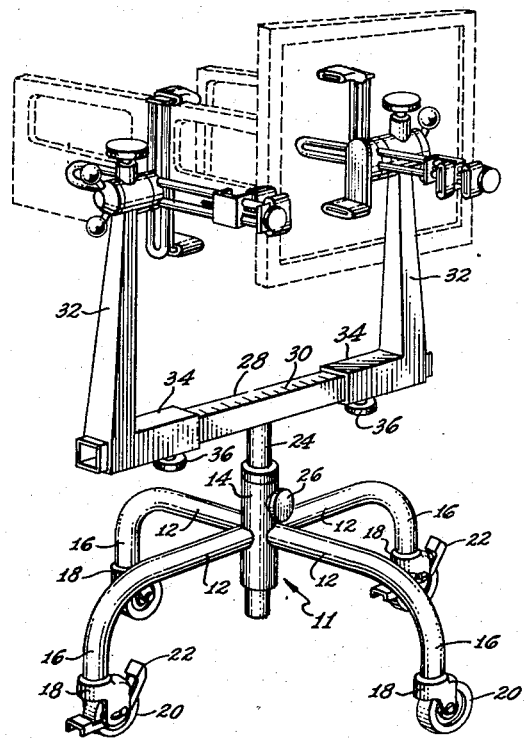
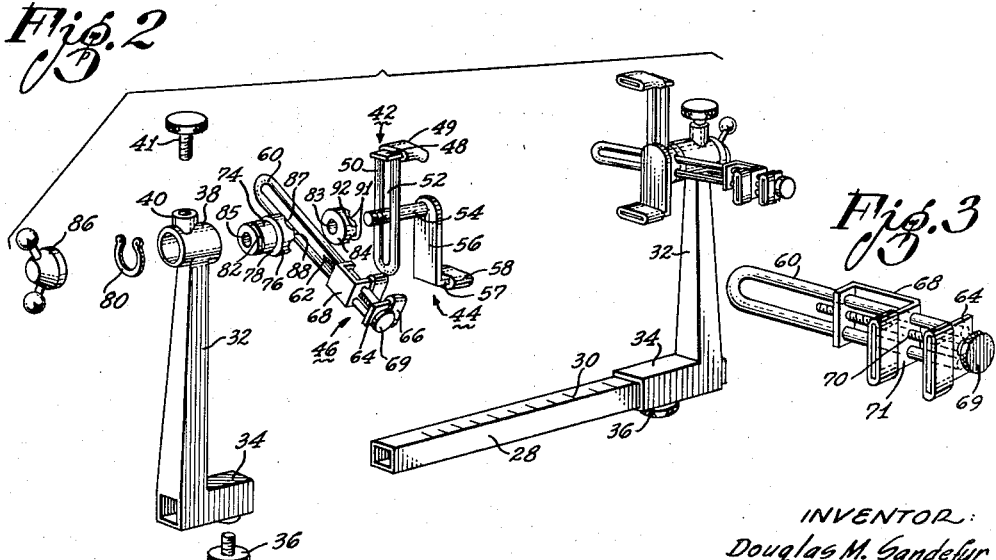
INVENTOR:
Douglas M. Sandefur 2,879,059
Patented Mar. 24, 1959

2,879,059

MOBILE WORKHOLDING DEVICE

Douglas M. Sandefur, Inglewood, Calif., assignor to Flotion Industries, Inglewood, Calif., a corporation of California Application March 13, 1958, Serial No. 721,154

1 Claim. (Cl. 269—156)

This invention relates to workholding devices and involves a novel combination which is adapted to support on rolling elements, a device capable of holding a frame, such as an electronic chassis, for work thereon in an assembly line operation.

In the manufacture of certain types of apparatus, such as electronic appliances (e.g. radio and television sets and amplifiers) an assembly line may be organized conventionally in such a manner that each of a number of workers adds one or more components to a metal chassis and connects them, by soldering or otherwise, in a predetermined circuit pattern. Such assembly lines usually are laid out on an extended work bench or table, and as the work performed at each station is completed, the unit is manually picked up and passed to the next station. Assembly lines thus organized require an extensive bench on or under which the component parts for incorporation into the unit may be contained. The worker is forced to organize the space on the bench before him or her in such a manner as to provide a receiving area for the unit being worked upon, as well as an area for the disposition of component parts and tools which are used by the workman in the course of the operation on the unit which is performed by him or her. Another problem of bench type assembly line operation is that the workers are either required to stand behind the bench, or if they are provided with high stools, these latter are uncomfortable and the worker is constantly having to get on or off the stool, with resultant fatigue which requires frequent rest periods.

Another difficulty with the use of a work bench as an assembly line operation, lies in the fact that the unit being worked upon must always be laid upon the horizontal surface of the work bench, and where the worker is required to operate upon the unit at a different angle than the horizontal, the unit must be mounted to a jig or fixture or the worker must utilize one of his or her hands to hold the unit on the work bench in the desired angle.

It is an object of my present invention to provide a device suitable for assembly line organization to permit workers to efficiently complete work and assembly operations on a part or workpiece and yet remain seated comfortably in the course of performing their work on the unit being processed.

My invention accomplishes this object in that it provides means for holding a workpiece, such as an electronic chassis, and for fixedly clamping and disposing such workpiece at any angle so as to permit easy access thereto by any worker on the assembly line. In its preferred embodiment, my novel device is built upon a pedestal framework which is mounted on wheel elements, at least some of which elements are adapted to be locked temporarily against rolling movement. However, at the option of the worker, the locking mechanism may be readily released so that my device, with the chassis or other structure clamped and held therein, may be rolled from one station to another along an assembly line. My device further includes means for adjusting the height of the unit being held, as well as means to enable the unit to be disposed at any angle relative to vertical and horizontal planes. The last said means, are adapted to provide a quick change in the angle of the work piece being held, so that, as the unit moves from station to station, the angle of disposition may be readily modified to permit different operators to perform different operations upon the unit in different positions thereof.

Another feature of my novel work holder is its ability to have its work holding members expanded and contracted in all directions within certain range limitations to accommodate a wide variety of sizes and shapes of work pieces. I also provide special clamping means adapted to receive and grasp a flat panel and member, the edges of which may project beyond the sides of the chassis or other box-like unit which is being worked upon.

The foregoing and other features of my invention are described in detail with reference to the accompanying drawings, in which:

Figure 1 is a perspective view of the preferred embodiment of my invention;

Figure 2 is an exploded view of the various components which are assembled in the manner shown in Figure 1 to provide my novel work holder; and Figure 3 is a perspective view of one clamp member.

Referring to Figure 1, in the now preferred embodiment of the device of the present invention, a base frame or pedestal 11 in the form of a spider having a plurality of legs 12 radiating from a cylindrical sleeve body 14 forms a mobile support unit. The legs 12 are preferably tubular members each of which is spaced equi-distantly about the axis of the sleeve 14. The outermost extremities 16 of these tubular members are turned downwardly and capped with castor units 18 having conventional wheels 20 movable 360° about the downwardly turned lower end 16 of the tubular member 12 to which the wheel is mounted. At least two of the castor units 18 are provided with braking or locking mechanisms 22 which, when lowered from their raised positions, serve to prevent the wheels 20 from rolling.

The sleeve 14 slidably receives a vertically extending tubular support member 24 which may be locked in any desired position of adjustment relative to the sleeve 14 by means of a thumb set screw 26 mounted in a tapped bore formed in the wall of the sleeve. A horizontal cross-bar 28 is welded or otherwise secured to the top of the vertical tubular member 24. This cross-bar 28 is provided with a series of markings 30 in inches or centimeters which serve to indicate the approximate width for the object which may be comprehended by the actual holding means.

The cross-bar 28 slidably carries a pair of vertical elements or stanchions 32, each of which is secured to or formed integrally with a sleeve-like base member 34 telescopically fitted over an end of the cross-bar 28. The lower wall of each member 34 is drilled and tapped to receive a set screw 36 for securing the member against movement. It is apparent that the cross-bar 28 together with the two vertical elements or stanchions 32 comprises an upright yoke with adjustably spaced arms. At the upper extremity of the stanchion 32, there is further provided, preferably integrally formed therewith, a short transversely disposed sleeve 38 formed with a boss 40 having a tapped bore for receiving a set screw 41.

Each stanchion or vertical element 32 carries a clamp assembly comprising three workholding L-shaped clamp members 42, 44 and 46. These three clamping members, in cooperation with their opposites mounted on the other stanchion or vertical element 32, enable the workpiece to be rigidly supported therebetween. The clamp member 42 includes a leg portion 48 over which is fitted an elastomeric sleeve 49 to prevent the leg from marring the workpiece. The longer leg 50 of the clamp member 42 is slotted at 52 to receive a pivot means in the form of a threaded stud 54 normally projecting from the one face of the longer leg 56 of the L-shaped clamp member 44. The other or short leg 57 of the member 44 is also tipped with a rubber-like sleeve 58.

The clamp member 46 also includes a leg 60, which is slotted at 62, and a laterally projecting short leg 64, the extremity of which is also fitted with rubber-like sleeve 66. The leg 60 of the clamp member 46, referring now to Figure 3, slidably mounts a U-shaped support 68 which may be held in a selected position thereon by a lead screw 69 threadedly mounted in a tapped bore 70 formed in the one leg of the support 68 and extended for support through an opening formed in the other leg of the U-shaped support. The support 68 carries a projecting jaw 71 which, as will be seen, cooperates with the short leg 64 to form a vise-like clamping unit.

The clamp members 42, 44 and 46 of a clamp assembly are to be mounted for rotary movement about the axis of the assembly which axis is the axis of the bore of the sleeve 38 of the vertical stanchion 32 in which the clamp assembly is mounted. To this end, the sleeve 38 is fitted with a bushing 74 having an enlarged end portion forming a collar 76. The bushing is of a length sufficient to project beyond the one end face of the sleeve 38 when the shoulder 78 of the collar 76 is engaged with the opposite end face of the sleeve. In the now preferred embodiment of the invention, the bushing 74 is held against axial withdrawal from the sleeve 38 by a resilient snap ring 80 mounted in an annular groove 82 formed in the projecting end of the bushing 74 opposite to the end on which the collar 78 is formed.

To mount the clamp members 42, 44 and 46 to the stanchion, the threaded stud 54 of the member 44 is passed through slot 52 of the leg 50 of the member 42, the bore 83 of a spacing collar 84, the slot 62 of the member 46 and the bore 85 of the bushing 74. The stud 54 is of such a length as to extend beyond the outer end face of the sleeve 38, and threadedly mounts a hand knob 86 for drawing all elements of the assembly into a clamped relationship between the collar 76 of the bushing 74 and the leg 56 of the clamp member 44. To facilitate the longitudinal adjustment of the slotted legs of the clamp members 42 and 46 and to hold the latter against accidental rotational movement relative to each other, it is now preferred to form guide elements on the faces of the collars 76 and 84 for engagement with the slotted legs 50, 60 of the members 42 and 46, respectively. To this end, the end face of the collar 76 is formed with a plurality of grooves 87 providing a plurality of circumferentially spaced lugs 88, diametrically spaced pairs of which are to be selectively fitted in the slot 62 thereby to hold the leg 60 against the rotational movement relative to the bushing 74, while permitting axial or longitudinal movement of the leg 60 relative to the bushing 74 as the leg moves in a path determined by the grooves 87. Further, the one face of the spacing collar 84 is formed with a flat surface adapted to clampingly engage against the slotted leg 60 of clamp 46 to hold the latter against longitudinal movement after the hand knob 86 is tightened. The opposite face of the spacing collar 84 is provided with a series of grooves 91 forming lugs 92 similar to the lugs 88 which coact with the slotted leg 50 of the clamp member 42 in the same manner as do the lugs 88 cooperate with the slotted leg 60 of the clamp member 46.

It will now be seen that the slotted legs 50 and 60 of the clamp members 42 and 46, respectively, are free to move longitudinally to the extent permitted by the slots 52 and 62. Clamp 46 however, is held against rotation relative to the bushing 74 in the clamped relationship of the assembly while clamp 42 may be rotatably adjusted relative to the bushing 74 and clamp 42. The clamp member 44 is also free rotatably to move about the axis of the stud 54 to permit movement of this clamp member to a desired or necessary location relative to the other two clamp members to clampingly mount the workpiece against the work-engaging elements of the other two clamp members. This permits, as should now be understood, a more universal clamping arrangement than would be had if all three clamp members were mounted in a fixed spatial relationship relative to each other.

Furthermore, the fixed relationship between the clamp members 42 and the bushing 74, once the hand knob 86 has been tightened, provides a very rigid support for the workpiece as there is no possibility of the leg 60 inadvertently moving relative to the bushing under the pressural forces created by the clamp members 42 and 44.

It can also be pointed out that the two clamp members 42 and 44 can, once the hand knob is loosened, be adjusted relative to each other as well as the clamp member 46, but that the latter is fixed relative to the bushing 74 by the disposition of the guide elements formed by the lugs 88 of the bushing. As will now be understood, the spatial position of the clamp member 46 can be fixed relative to the stanchion 32 by the set screw 41 mounted in the tapped bore of the boss 40 and adapted when tightened to hold the bushing 74 against rotation. To prevent scoring of the bushing 74 by the set screw, it is now preferred to mount a small block, not shown, within the boss 40 and adapted to bear against the bushing under the thrust of the set screw 41.

It is apparent that the two clamp members 42 and 44 constitute a pair of jaws rotatable about the axis of the clamp assembly and positioned on a common diameter on opposite sides of the axis to grasp a workpiece from opposite sides of the workpiece. It is further apparent that the clamp member 46 provides a second pair of relatively closely spaced jaws both of which are on one side of the clamp assembly axis and at an angle to the diameter on which the two jaws 42 and 44 are positioned. This second pair of jaws provided by the clamp member 46 grips a portion of the workpiece at a radial distance from the clamp assembly axis.

Although the now preferred embodiment of the present invention has been shown and described herein, it is to be understood that the invention is not to be limited thereto, for it is susceptible to changes in form and detail within the scope of the appended claim.

I claim:

In a device for movement along an assembly line to hold a workpiece for operations thereon, which device has a mobile base carrying a yoke with laterally spaced upright arms, a pair of clamp assemblies mounted on said two yoke arms respectively and facing each other to cooperate with each other to hold a workpiece, each of said clamp assemblies including: a pivot means extending through the upper end of the corresponding yoke arm; a plurality of collars on said pivot means; a plurality of radial arms at said collars respectively, clamp elements on said arms including a first diametrical pair of clamp elements and a second pair of clamp elements on the outer end of one of the arms; and screw means effective between said pivot means and said yoke arm to shift the pivot means axially to tighten said collars against the yoke arm to immobilize said arms of the clamp assembly.

References Cited in the file of this patent

UNITED STATES PATENTS

| 341,662 | Kirkland | May 11, 1886 |
| 593,139 | Thomas | Nov. 2, 1897 |
| 842,007 | Parker | Jan. 22, 1907 |
| 1,013,711 | Wiggins | Jan. 2, 1912 |
| 1,084,130 | Cargin | Jan. 13, 1914 |
| 1,137,333 | Klorer | Apr. 27, 1915 |
| 1,323,127 | Treuthardt | Nov. 25, 1919 |
| 1,345,177 | Heckathorn | June 29, 1920 |

(Other references on following page)

UNITED STATES PATENTS

| | | |
|---|---|---|
| 2,135,191 | McBrady | Nov. 1, 1938 |
| 2,463,966 | Hauschild | Mar. 8, 1949 |
| 2,567,996 | Gaffney | Sept. 18, 1951 |
| 2,606,583 | O'Connor | Aug. 12, 1952 |
| 2,825,477 | Ross | Mar. 4, 1958 |

FOREIGN PATENTS

| | | |
|---|---|---|
| 283,846 | Switzerland | June 30, 1952 |

OTHER REFERENCES

Life Magazine, page 44, June 3, 1957, vol. 42, No. 22.

UNITED STATES PATENT OFFICE

CERTIFICATE OF CORRECTION

Patent No. 2,879,059                                      March 24, 1959

Douglas M. Sandefur

It is hereby certified that error appears in the above numbered patent requiring correction and that the said Letters Patent should read as corrected below.

In the grant, lines 2 and 12, and in the heading to the printed specification, lines 3 and 4, name of assignee, for "Flotion Industries" read -- Flotron Industries --.

Signed and sealed this 25th day of August 1959.

(SEAL)

Attest:

KARL H. AXLINE                                            ROBERT C. WATS(
Attesting Officer                                      Commissioner of Pater